E. H. REMDE.
VEHICLE BODY.
APPLICATION FILED FEB. 27, 1908.
932,058.
Patented Aug. 24, 1909.
2 SHEETS—SHEET 1.
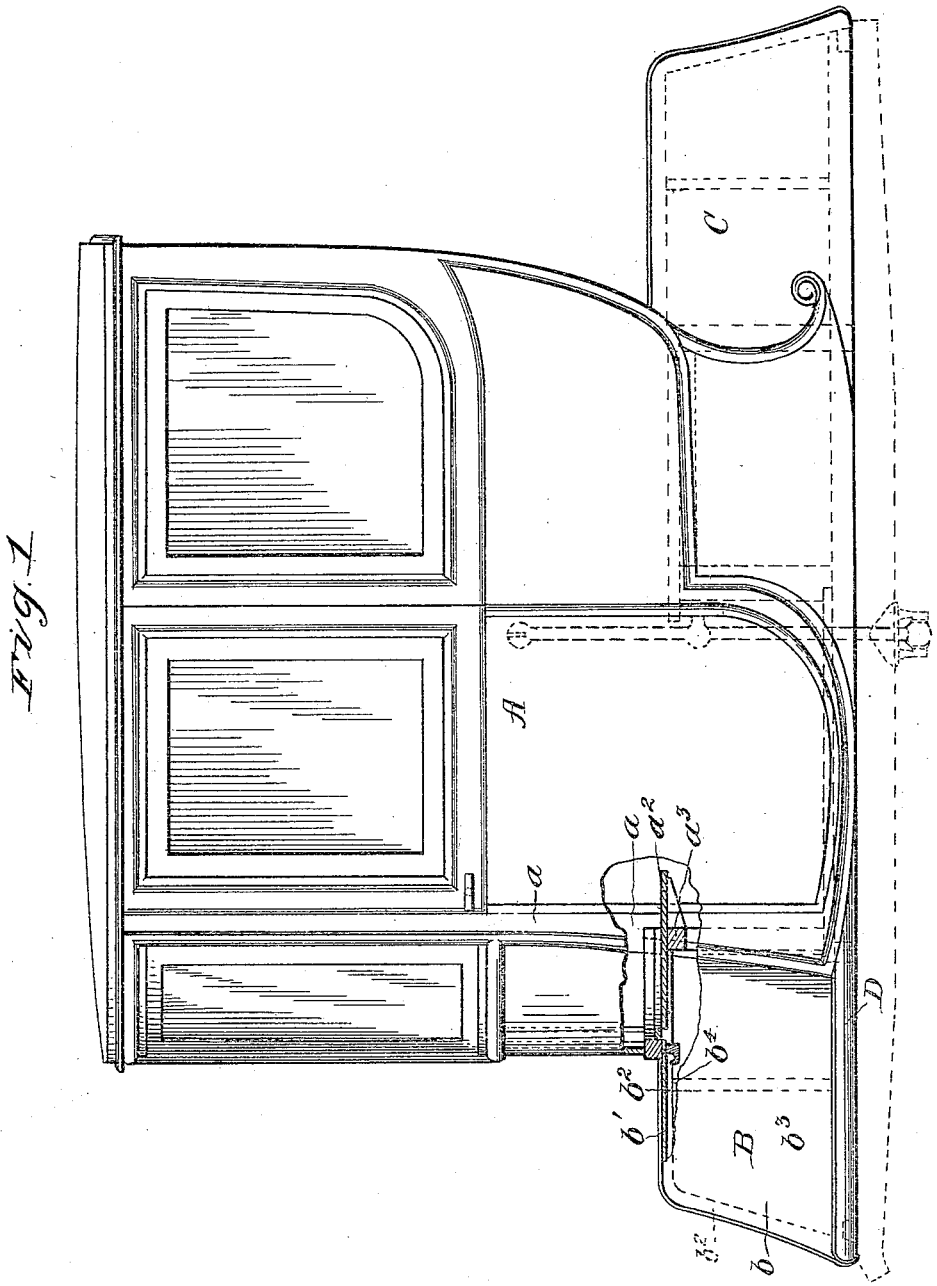
Witnesses:
J. C. Turner
Lena A. Dirlam
Inventor:
Edward H. Remde
by A. E. Merkel
his Attorney.

E. H. REMDE.
VEHICLE BODY.
APPLICATION FILED FEB. 27, 1908.
932,058.
Patented Aug. 24, 1909.
2 SHEETS—SHEET 2.
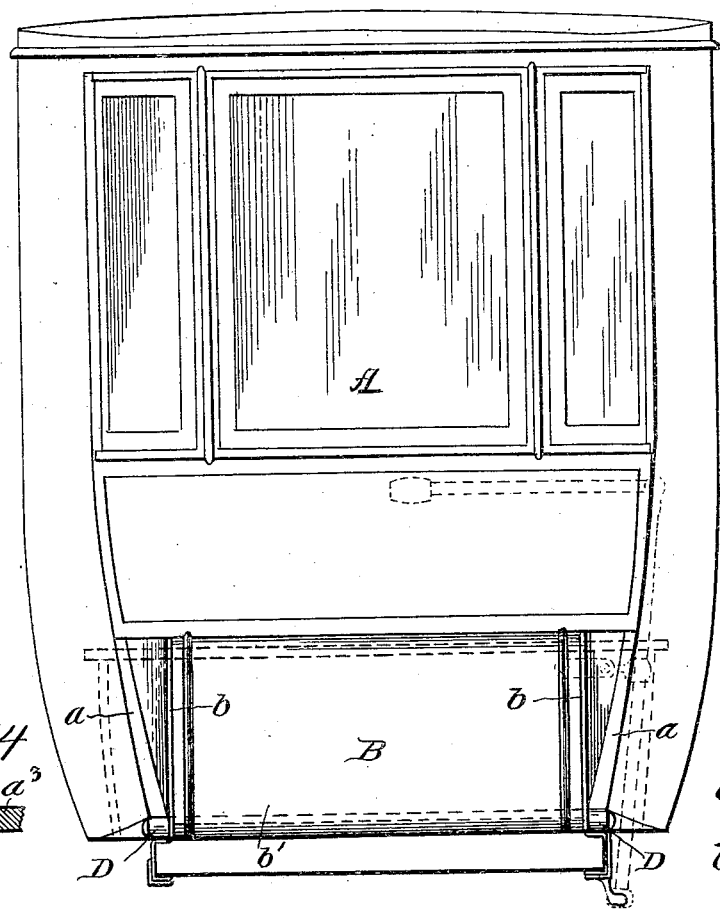
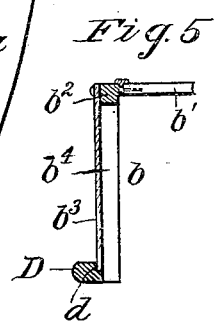
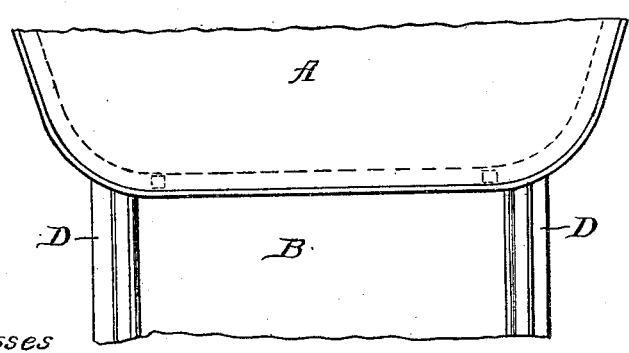

UNITED STATES PATENT OFFICE.

EDWARD H. REMDE, OF CLEVELAND, OHIO, ASSIGNOR TO THE BAKER MOTOR VEHICLE COMPANY, OF CLEVELAND, OHIO, A CORPORATION OF OHIO.

VEHICLE-BODY.

932,058.  Specification of Letters Patent.  Patented Aug. 24, 1909.

Application filed February 27, 1908. Serial No. 418,007.

*To all whom it may concern:*

Be it known that I, EDWARD H. REMDE, a citizen of the United States, resident of Cleveland, county of Cuyahoga, and State of Ohio, have invented a new and useful Improvement in Vehicle-Bodies, of which the following is a specification, the principle of the invention being herein explained and the best mode in which I have contemplated applying that principle, so as to distinguish it from other inventions.

My invention relates to vehicle bodies and particularly to what is ordinarily termed "coupé" bodies for electrically propelled motor vehicles.

The object of said invention is to provide more room in the interior of the inclosing or main portion of the body, and to combine strength of structure with neatness of appearance without departing from the coupé design of the body.

Said invention consists of means hereinafter fully described and specifically set forth in the claims.

The annexed drawings and the following description set forth in detail, certain means embodying the invention, the disclosed means constituting but one of various mechanical forms in which the principle of the invention may be applied.

In said annexed drawings:—Figure 1 represents a side elevation, partly in section, of the vehicle body embodying my invention. Fig. 2 represents a front elevation of same. Fig. 3 represents a plan of the front portion of the vehicle body, with the forward portion of the front battery case broken away. Figs. 4 and 5 represent detail sections.

The body consists of four principal parts: the main or inclosing portion A, the front battery case B, the rear battery case C, and the sills D. The front battery case B consists of the two permanently secured side members $b$ $b$ which extend forwardly from the forward or "coupé" pillars $a$ $a$ of the member A, as shown in Fig. 1; a suitable bottom, and a removable cover $b'$ which forms the top and front of the case as in the ordinary construction. Each side member $b$ $b$ includes a curved bar $b^2$, a panel $b^3$ and a stiffening bar $b^4$. The curved bar $b^2$ is secured to the inside surface of the panel and along its front and top edges as shown in Figs. 1 and 5. Its inner end is secured in a rabbeted seat $a'$ in the corresponding pillar $a$, Fig. 4. A rabbeted seat $d$ is formed upon the inner surface of each sill D, Fig. 5, in which the corresponding panel $b^3$ is seated and secured. The lower ends of the pillars $a$ $a$ rest directly upon the sills D D as shown in Figs. 2 and 4, which form a base or support therefor. The panels extend into the interior of part A, as shown, and form the support for the front portion of said part, and upon such inwardly extending part of the panels is built a seat $a^2$, a bar $a^3$ being secured to the pillars $a$ $a$, Fig. 4, to form a transverse supporting member therefor. As shown the seat $a^2$ extends rearwardly beyond the inner end of the battery case, the transverse bar $a^3$ being incorporated in the battery case structure and forming the inner extremity of the upper portion thereof. The front portion of part A and which extends forwardly of the pillars $a$ $a$, is made of curved outline, as shown in Fig. 3, and forms what is termed a "curved extension" front. By placing the panels $b^3$ $b^3$ upon the inside of the sills D D the pillars are permitted to rest upon the latter and still permit their lower ends to remain entirely visible thereby maintaining what is known as the "coupé effect" and at the same time permitting the employment of a superior mechanical structure.

Other modes of applying the principle of my invention may be employed, instead of the one explained, and change may be made as regards the mechanism herein disclosed, provided the means covered by any one of the following claims be employed.

I, therefore, particularly point out and distinctly claim as my invention:—

1. A vehicle body comprising an inclosing portion and a front battery case extending forwardly beyond same, said inclosing portion including a part extending forwardly of the front pillars and partially over said case.

2. A vehicle body comprising an inclosing portion and a front battery case extending forwardly therefrom, said inclosing portion including a part extending forwardly of the front pillars, partially over said case and supported by the sides of the latter.

3. A vehicle body comprising an inclosing portion and a front battery case extending forwardly beyond same, said inclosing portion including a part extending forwardly of the front pillars and partially over said case, the latter extending into the interior of the inclosing portion a distance substantially equal to the depth of said forwardly extending portion.

4. A vehicle body comprising in one permanently organized structure, an inclosing portion and a front battery case extending forwardly beyond same, said inclosing portion including a part extending forwardly of the front pillars and partially over said case, whereby a portion of the latter is caused to project into the interior of the inclosing portion, the inner end of said inwardly projecting portion being supported by said front pillars.

5. In a vehicle, the combination of longitudinally extending lower side sills; an inclosing portion connected with said sills; a front battery case extending forwardly beyond said inclosing portion and supported by said sills; said inclosing portion including a part extending forwardly beyond its front pillars.

6. In a vehicle body, the combination of side sills; a main or inclosing portion having a part thereof extending forwardly of its front pillars; a battery case extending forwardly beyond said inclosing portion; the front pillars of said main or inclosing portion having their lower ends resting upon said sills laterally of said case; the inner end of the latter extending into the main or inclosing portion; and a seat built upon said inwardly extending end and extending rearwardly beyond the latter.

Signed by me, this 20th day of February, 1908.

EDWARD H. REMDE.

Attested by—
 WM. ROTHENBERG,
 A. E. MERKEL.